United States Patent [19]

Stahl et al.

[11] 4,200,296
[45] Apr. 29, 1980

[54] FERROFLUID CENTRIFUGAL SEAL

[75] Inventors: Philip Stahl, Holliston, Mass.; Ronald Moskowitz; Walter R. Reed, both of Merrimack, N.H.

[73] Assignee: Ferrofluidics Corporation, Burlington, Mass.

[21] Appl. No.: 964,601

[22] Filed: Nov. 29, 1978

[51] Int. Cl.² .................... F16J 15/42; F16J 15/16
[52] U.S. Cl. .......................... 277/80; 277/13; 277/135
[58] Field of Search .............. 277/1, 13, 14 R, 14 V, 277/25, 80, 53, 55, 135, 68, 69

[56] References Cited

U.S. PATENT DOCUMENTS

| 2,587,077 | 2/1952 | Winther | 277/80 X |
|---|---|---|---|
| 2,834,618 | 5/1958 | Wiltse | 277/80 X |
| 2,874,982 | 2/1959 | Winther | 277/80 X |
| 2,996,162 | 8/1961 | Lehde | 277/80 X |
| 3,097,853 | 7/1963 | McHugh | 277/80 X |
| 3,254,745 | 6/1966 | Isakov et al. | 277/80 X |
| 3,620,584 | 11/1971 | Rosensweig | 277/80 X |
| 3,746,407 | 7/1973 | Stiles et al. | 277/80 X |
| 4,054,293 | 10/1977 | Hoeg | 277/13 |

FOREIGN PATENT DOCUMENTS

| 783881 | 10/1957 | United Kingdom | 277/80 |
|---|---|---|---|
| 494553 | 5/1975 | U.S.S.R. | 277/80 |

Primary Examiner—Robert S. Ward
Attorney, Agent, or Firm—Richard P. Crowley

[57] ABSTRACT

A ferrofluid centrifugal seal and method of sealing a rotatable shaft, wherein ferrofluid is retained in an O-ring-seal form at static and low speeds and is moved to a barrier seal in a passageway at high speeds.

13 Claims, 4 Drawing Figures

FERROFLUID CENTRIFUGAL SEAL

BACKGROUND OF THE INVENTION

Conventional centrifugal seals employ the principle of centrifugal effect at high speeds to retain a fluid for a sealing purpose. Such conventional centrifugal seals are typically secured to a rotating shaft member and use a lubricating liquid, such as oil, to effect the seal when the shaft member has reached a high speed. Such conventional centrifugal seals of this type function satisfactorily in the high-speed mode, but, at lower shaft speeds, the seal fluid is not retained in place, while, in the static mode, the seal does not support any pressure at all. Other difficulties associated with conventional centrifugal seals include problems associated with fluid leakage, limited life due to elastomer-seal wear and high torque and high static friction, which result from the use of elastomeric seals. Thus, a completely hermetic, high-speed, centrifugal shaft seal, which has sealing properties both at the static and low- and high-speed modes and with increased seal life and lower torque and static friction, would be most desirable.

Rotary-shaft seals employing ferrofluid, typically for vacuum applications, are known, and such seals are designed to withstand a pressure differential of up to 1 atmosphere under static, as well as dynamic, conditions. A multiple-stage, rotary-shaft ferrofluid seal is shown, for example, in U.S. Pat. No. 3,620,584, issued Nov. 16, 1971, hereby incorporated by reference. The seals employ a magnetic circuit consisting of a permanent magnet and pole pieces to provide the necessary magnetic flux to entrain discrete, magnetic-ferrofluid liquid O-rings in each annular stage of the seal, with the rotary shaft completing the magnetic circuit. Each ferrofluid O-ring is a total hermetic barrier to the passage of gas and typically may have a differential pressure capacity of 20 to 35 kPa (3 to 5 psi). The total pressure capacity of the multiple-stage ferrofluid seal is the sum of the pressure capacities of the individual stages in the seal.

SUMMARY OF THE INVENTION

This invention relates to a ferrofluid centrifugal seal and to a method of preparing and using such seal. In particular, this invention concerns an improved, completely hermetic, centrifugal seal employing a ferrofluid, which seal provides sealing capacity in static and in low-speed and high-speed modes.

The ferrofluid centrifugal seal of the invention has significant and important advantages over conventional oil centrifugal seals, since the seal of the invention provides for maintaining the sealing capacity at static, low, medium and high speeds, due to the retention of the ferrofluid by a magnetic structure, regardless of the speed of the rotary shaft to which the centrifugal seal is secured. In addition to eliminating static friction and minimizing drive torque, which are associated with conventional centrifugal seals, the life expectancy of the ferrofluid seal of this invention is also much higher, since such seal no longer depends on the life of the particular elastomer seal used. Further, the ferrofluid is retained in place by a magnetic field and cannot and does not leak out of the seal assembly. The ferrofluid centrifugal seal is particularly useful where the angular velocity is not constant and is sometimes low or zero, such as in flywheel applications.

The ferrofluid centrifugal seal of the invention comprises a rotatable, magnetic-structure assembly which is secured to a rotatable member, such as a rotatable shaft, for rotation therewith and includes a magnetic-structure assembly and a vane assembly, with a stationary vane positioned in a fluid cavity which contains ferrofluid. The vane comprises a single or preferably a plurality of static-sealing stages and includes a blade at the one or extended end thereof within the fluid cavity, which provides for a sealing capacity on high-speed rotation of the shaft member to which it is secured, while the plurality of stages in the vane provides for a static-sealing capacity and/or low-speed-sealing capacity.

In the static and low-speed modes of operation, the ferrofluid is held captive by the strong magnetic-field gradients under each discrete stage on the vane, and thus provides the necessary differential capability of the seal. At high speed, the rotation of the seal and the magnetic structure therein produce a centrifugal force on the ferrofluid, which is then spun away from the stages of the vane toward the outer extending perimeter of the ceavity and about the blade of the vane, with the blade defining a small passageway at the other or extended end of the stationary vane. High-speed centrifugal force forces the ferrofluid toward and about the blade and blade passageway, to provide a sealing capacity at high speeds.

In operation, the tendency to force the ferrofluid about the blade through the blade passageways, by differential pressure being sealed by the seal assembly, is opposed by the amount of centrifugal acceleration forces on the ferrofluid.

The ferrofluid develops a head (difference in its two levels as in a manometer) as a result of differential pressure applied to the seal, which is determined by:

$$P = \rho a h$$

where $\rho$ = density of ferrofluid; $a$ = acceleration; $h$ = pressure head. $a$, for the worst case, can be written as:

$$a = \omega^2 r - g$$

where $\omega$ = rotational speed; $r$ = nominal magnetic-fluid radius; $g$ = acceleration due to gravity, so that $$P = 92 \, h(\omega^2 r = g)$$
$$= \rho \omega^2 r - \rho h g$$

The effect of the second term is very small, especially at higher speeds. Using the seal design parameters: $\rho = 10^3$ kg.m$^{-3}$; $r = 0.037$ m; and $h = 0.0052$ m, we find that $P = (0.21 \times 10^{-4} \, N^2 - 0.51)$ kPa, where N is the speed in rpm ($\omega = 2\pi N/60$).

The value of pressure head used in these calculations corresponds to that of the length of the blade, so, for values of h greater than that of the length of the blade, ferrofluid would transfer completely to the low pressure side of the blade and the seal would than fail.

At high speeds, for centrifugal sealing to take place, it is necessary that the ferrofluid leave the stage region and be confined to the periphery of the cavity. This can be accomplished if the magnetic force is less than the centrifugal force at high speeds. These forces, on one gram or one cubic centimeter of fluid, taking the density of the fluid to be 1 gm/cc, are:

Centrifugal force on one gram of ferrofluid $(f_c) = mr\frac{(2\pi N)^2}{60}$

Substituting m = 1 g = 0.001 kg; r = 0.037 m $f_c = 4.05 \times 10^{-7} N^2$ Newtons Magnetic force on one cubic centimeter of ferrofluid $(f_m) =$ $$\frac{M_s}{4\pi}\left[\frac{dH}{dr}\right]$$

Substituting $M_s = 450$ gauss, $dH/dr = 10^4$ oe/cm $f_m = 3.58$ Newtons

The value of $f_c$ depends on the speed at which the seal is operating. The magnetic force ($f_m$), on the other hand, is independent of the speed. These two forces are compared in Table I. At low speeds (i.e., N<3,000 rpm), $f_m$ is greater than $f_c$. At N=3,000 rpm, both forces are nearly the same. At N>3,000 rpm, $f_c$ becomes greater than $f_m$.

TABLE I

Comparison of centrifugal and magnetic forces in the ferrofluid centrifugal seal.

| Speed (× 10³ rpm) | Centrifugal Force (Newtons) | Magnetic Force (Newtons) |
| --- | --- | --- |
| 0 | 0 | 3.58 |
| 0.1 | 0.004 | 3.58 |
| 1.0 | 0.405 | 3.58 |
| 3.0 | 3.645 | 3.58 |
| 5.0 | 10.125 | 3.58 |
| 10.0 | 40.500 | 3.58 |
| 50.0 | 1012.5 | 3.58 |

These calculations show that the mode of sealing depends on the rotational speed, and the centrifugal sealing dominates at high speeds. A further design consideration to assure the transfer of magnetic fluid into the cavity at high speeds would be to use a ferrofluid with low curie temperature. The viscous shear action would heat up the ferrofluid to the temperature where the fluid magnetization becomes negligible (thus reducing the magnetic force), and the ferrofluid then would be transferred automatically to the cavity. When fluid temperature drops, it would regain its magnetic property and provide static-sealing capability.

The centrifugal seal uses the ferrofluid for centrifugal sealing at high speeds and provides the ferrofluid hermetic seal at low and medium speeds. This hybrid centrifugal seal thus provides effective sealing capability over the entire speed range.

The ferrofluid employed in the improved centrifugal seal of this invention typically comprises a magnetic liquid of three components, incuding a carrier fluid, magnetic particles and a stabilizer. The carrier liquid, for sealing application, is usually selected from a liquid, such as organic lubricating oils, to include, but not be limited to, diesters, fluorocarbon or polyphenyl-ether liquids, depending on the particular environmental usage of the seal. The diester liquid often is used where no special environmental demands are made on the seal, such as in standard vacuum applications, since the diester-base ferrofluid has a low vapor pressure. Fluorocarbon-base ferrofluid often is employed to seal toxic-reactive environments, such as found in the chemical-processing industry. Fluorocarbon-liquid-base ferrofluids, as well as diester-liquid-base ferrofluids, retain integrity in the presence of mild radioactivity; however, under high radiation dosages, polyphenyl-ether liquids are often selected, based on higher resistance to polymerization. However, the carrier liquid may be composed of a wide variety of liquid materials.

The magnetic particles are colloidal stable dispersions of magnetic particles ($Fe_3O_4$) usually with a loading volume of about 2% to 10% to impart magnetic properties to the carrier fluid. The stabilizers are employed to coat the magnetic particles with a monomolecular layer to prevent coalescence and sedimentation of the particles under the influence of the attractive magnetic forces employed or gravity. Usually the submicron-size magnetic particles are so small (0.01 microns or less) that they do not cause wear during use in a sealing application. The choice of a particular ferrofluid and the amount to effect sealing may be selected, based on the particular application and structure of the centrifugal seal.

This invention will be described for the purpose of illustration only in connection with certain preferred embodiments; however, it is recognized that a person skilled in the art may make various changes and modifications to the described illustration, without departing from the spirit and scope of the invention.

DESCRIPTION OF THE PREFERRED EMBODIMENTS

Figure 1:
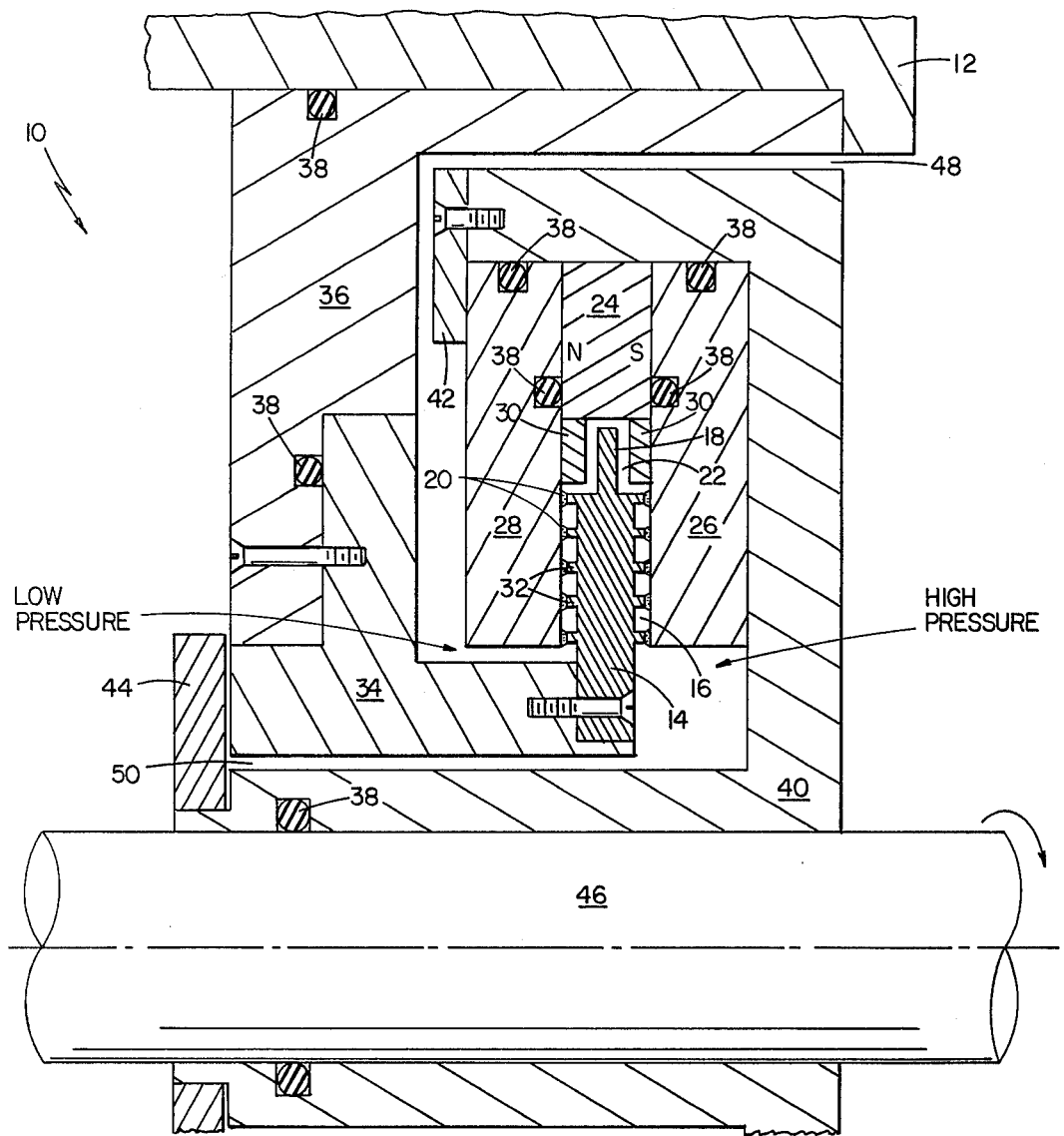
FIG. 1 is a schematic cross-sectional illustration of the ferrofluid centrifugal seal secured to the rotatable shaft member.

FIG. 1 is a schematic diagram of an improved centrifugal seal assembly 10 of the invention, which seal is disposed in a housing 12, typically a housing supplied by a user, which seal 10 is secured by a clamp 44 to a rotatable shaft 46 in a sealing relationship with the shaft and the seal adapted to be rotated with the shaft 46. The seal assembly 10 is adapted to form a seal typically between a high-pressure environment on one side of the seal and a low-pressure environment on the opposite side of the seal. The seal comprises in combination a vane assembly and a magnetic-structure assembly. The vane assembly comprises a stationary vane 14 composed of a ferromagnetic material which contains at one end a thin extending blade 18 and vane assembly elements 34 and 36 thereadably secured together. The magnetic-structure assembly comprises a permanent magnet 24 which contains secured to each side thereof and extending therefrom ferromagnetic pole pieces 26 and 28 to define an elongated cavity 16 therebetween in which the stationary vane 14 is positioned.

The magnetic-structure assembly includes a retaining element 40 having a lip at one end, so that the clamp 44 or other means, such as a set screw or the like, may be employed to secure the seal 10 to the rotatable shaft 46, and includes element 42 to secure the pole pieces 26 and 28 to either side of the magnet 24. The vane assembly and the magnetic-structure assembly in combination, as shown and illustrated, are securely fastened to the rotatable shaft 46, with elastomer seals 38 positioned to ensure a sealing relationship in the assembly. The magnet 24 should be placed in magnetic-flux and coupling relationship with the pole pieces 26 and 28 and vane 14, to provide a magnetic circuit with the ferrofluid. The assemblies in combination define a high-pressure passageway 48 and a low-pressure passageway 50, each leading to opposite sides of the cavity 16. Within cavity 16 there are positioned spacer elements 40, in order to reduce the volume of the top of the cavity and to minimize the volume of ferrofluid required in the high-speed sealing mode. The spacer elements 30, together with the extending blade 18, defines a top, inverted, U-shaped cavity or blade passageway 22 which provides gas-flow communication about the blade element through cavity 14 with passageways 48 and 50.

In the preferred embodiment, the vane 14 includes a series of radially extending, spaced lips 32 thereon which define a plurality of ferrofluid-seal stages, the vane being ferromagnetic and adapted to contain in each stage liquid O-ring ferrofluid seals 20. The lip elements 32 extend into a close, but noncontacting, relationship with the inner surface of the pole pieces 26 and 28 which define the cavity.

The schematic diagram of FIG. 1 illustrates the improved centrifugal seal at a static condition; that is, with the ferrofluid 20 captured at the various stages of the radial lips 32 and no ferrofluid in the blade passageway 22, and illustrates the seal in a static no-speed-operation-sealing mode. The improved centrifugal seal as illustrated typically has particular use where the surface speeds on the rotating member, such as the rotating shaft, are high, such as over 500,000 dN (mm×revolutions per minute of the shaft diameter). The improved seal assembly typically would be employed, for example, in flywheels of electrical vehicles, particularly where a flywheel or other object moves in a vacuum and where it is desirable to minimize energy consumption of the flywheel or object in the vacuum.

Figure 2:
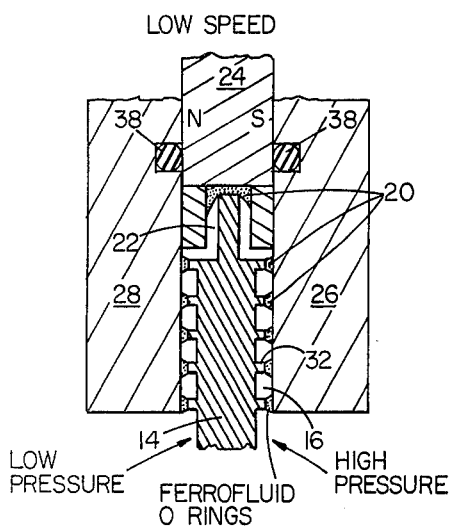
FIG. 2 is a schematic, illustrative, cross-sectional, fragmentary view showing the position of the ferrofluid in the seal of FIG. 1 at low speeds.

FIG. 2 illustrates the operation of the centrifugal seal 10 in a fragmentary view, wherein the shaft 46 is rotating at or in a low-speed mode. As illustrated, a plurality of separate seal stages are formed by the ferrofluid O-rings captured in the radial lips 32 of the vane 14 in the cavity 16, wherein the magnetic flux provides a magnetic circuit from the permanent magnet 24 through the respective pole pieces 28 and 26 and the lips 32. The ferrofluid so captured provides for sealing at the low speed, while, in addition, at the low speed, some of the ferrofluid 20 has been forced by centrifugal force into the top cavity passageway 22 to form a ferrofluid barrier, as illustrated, between the upper edge of the blade 18, so that the seal in the illustrated low-speed mode may form both a barrier and an interstage seal.

Figure 3:
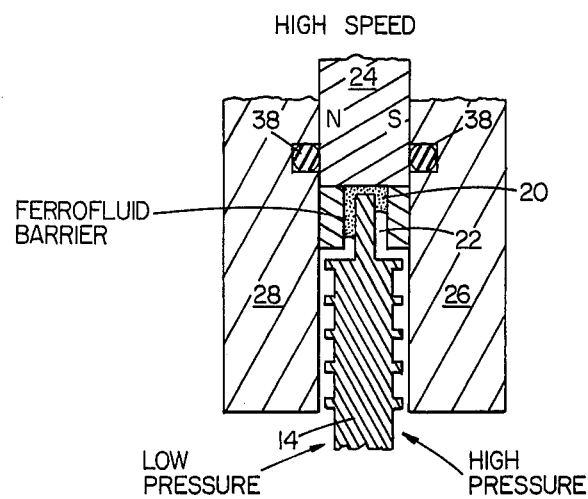
FIG. 3 is a schematic, illustrative, cross-sectional, fragmentary view showing the position of the ferrofluid in the seal of FIG. 2 at high speeds.

FIG. 3 is a schematic illustration of the improved centrifugal seal 10 shown in a high-speed mode, wherein the centrifugal force is greater than the magnetic-attractive force at the multiple-stage seal, and all of the ferrofluid 20 is concentrated in the top-cavity blade passageway 22 to form a ferrofluid barrier in the passageway about and around the blade 18. As described and illustrated, the length of the blade may vary as desired.

Figure 4:
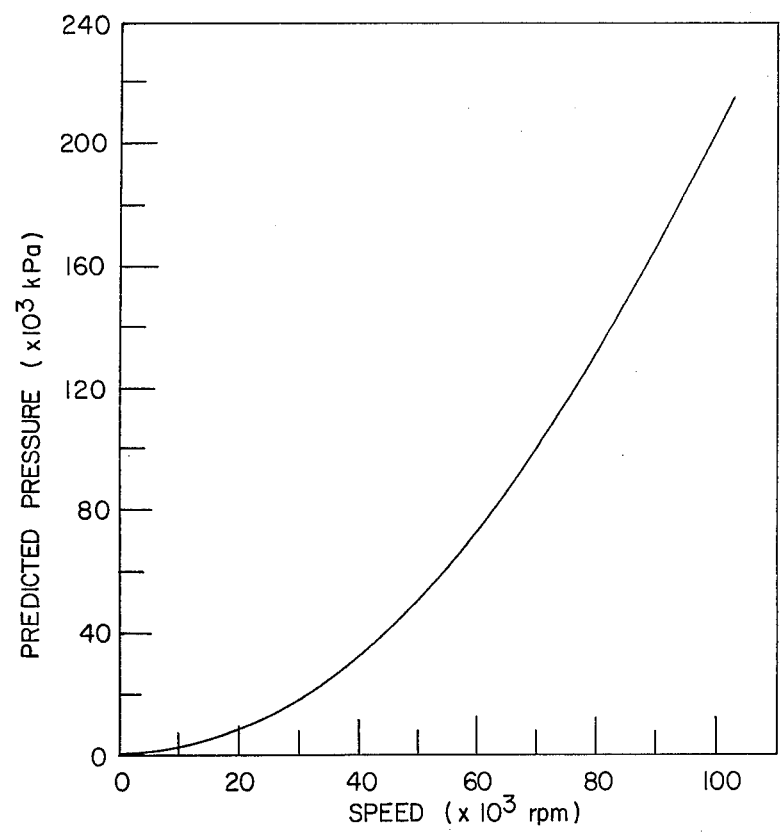
FIG. 4 is a graphical illustration of the pressure capacity of the centrifugal seal of FIG. 1 as a function of speed.

FIG. 4 illustrates the pressure capacity of the centrifugal seal 10 in terms of predicted pressure of kilopascals (kPa) as a function of the speed (in rpms), with the contribution of the second term of the equation ($\rho hg$) represented by the flat dotted line in the figure. Thus the graph of FIG. 4 shows the maximum pressure capacity of the seal at a given speed.

Thus, as described and illustrated, in operation of the improved centrifugal seal in the static and low speeds, sealing is effected through multiple-stage magnetic ferrofluid O-ring sealing, and, in low speeds, the stage sealing predominantly contributes to the sealing, while, at high speeds, the sealing is effected through the centrifugal force, with the ferrofluid serving as a barrier ferrofluid in the passageway. In FIG. 4, the contribution of the static and low-speed sealing is not shown in the diagram, while the dotted line shows the contribution substantially arising from gravitational forces.

The improved centrifugal seal, as described and illustrated, provides significant and new advantages not possible with conventional centrifugal seals, in that sealing is effected at zero to high speeds, together with reduced torque and friction and the avoidance of fluid leakage in the elastomer-seal wear.

What is claimed is:

1. A centrifugal seal, the seal adapted to be secured to a rotatable shaft member for rotation therewith and to provide a seal between environments on opposite sides of the centrifugal seal, which seal comprises in combination:
   (a) a vane assembly which includes a stationary, ferromagnetic vane characterized by a plurality of spaced, radially extending lip elements about the surface periphery thereof and a blade element extending from one end thereof;
   (b) a magnetic-structure assembly which comprises
     (i) a permanent magnet, and
     (ii) a pair of ferromagnetic pole pieces extending, in a magnetic-flux relationship, from the permanent magnet to define a cavity between the pole pieces, the blade element extending into the cavity;
   (c) the magnetic-structure assembly and the vane assembly in combination forming a seal assembly and defining a passageway from one surface of the seal into the cavity and another passageway from the other surface of the seal into the opposite side of the cavity;
   (d) ferrofluid disposed within the cavity;
   (e) the vane disposed in the cavity and defining with the pole pieces a gas-flow passageway extending about the external side and one end surface thereof, which, in the absence of the ferrofluid, provides gas-flow communication between the one and the other passageways; and
   (f) the radial-lip elements extending into a close noncontacting relationship with the inner surface of each of the pole pieces, to define with the ferrofluid a magnetic-flux circuit between the permanent magnet, the pole pieces and the stationary vane, whereby, in a static nonrotatable mode, the ferrofluid forms a plurality of stage seals between the lip elements and the pole pieces, and whereby, at a high-speed mode, the ferrofluid is forced by centrifugal force to one extending end of the cavity to form a seal barrier therein, thereby providing an improved centrifugal seal which provides for a sealing capacity with the same ferrofluid under static conditions or varying speed conditions.

2. A seal assembly which includes:
(a) a rotatable shaft;
(b) means to secure a housing element to the seal of claim 1; and
(c) means to secure the seal in a sealing relationship to the rotatable shaft and between the shaft and the housing.

3. The centrifugal seal of claim 1 wherein the stationary vane includes a thin blade element of predetermined height extending from the one end of the vane, the blade element forming in the cavity a generally inverted, U-shaped passageway about the blade element, whereby, in the high-speed mode on rotation of a shaft to which the seal is secured, the ferrofluid forms a barrier seal in the passageway about the sides and end of the blade element.

4. The centrifugal seal of claim 3 which includes the use of spacer elements in the upper extending portion of the cavity to define a narrow, inverted, U-shaped passageway on either side and about the blade element, the narrow passageway extending from one to the other side of the vane element.

5. The centrifugal seal of claim 1 wherein the ferrofluid comprises a liquid carrier composed of an organic diester liquid, a fluorocarbon liquid or a polyphenylether liquid.

6. A centrifugal seal adapted to be secured to a rotatable shaft member for rotation therewith and to provide a seal between environments on opposite sides of the seal surface, which seal comprises in combination:
(a) a vane assembly, which vane assembly comprises a stationary vane composed of ferromagnetic material, the vane characterized by a plurality of spaced lip elements radially extending around the vane element, and an extending blade element, the blade element extending from one end of the vane element;
(b) a magnetic-structure assembly, which magnetic-structure assembly comprises
 (i) a permanent magnet, and
 (ii) a pair of first and second ferromagnetic pole-piece members extending from and in a magnetic-flux relationship with the permanent magnet, to define an elongated cavity between the inner surfaces of said pole-piece members, the cavity adapted to receive the stationary vane element, and spacer means on the upper part of the cavity to reduce the volume of the cavity, so as to receive therein the extending blade element and to form a narrow, generally inverted, U-shaped passageway extending from the one side of the vane element to the other side of the vane element over and about the blade element, and means to secure together the pole pieces and magnet;
(c) the stationary vane assembly and the magnetic-structure assembly containing elements secured together in a sealed relationship and which in combination form a passageway from one side of the cavity into one environment on one side of the seal and a passaageway into the cavity on the other side of the seal; and
(d) ferrofluid positioned in the cavity, the ferrofluid present in an amount sufficient to form, at static or low speeds, a plurality of interstage seals between the extending lip and the inner surface of the pole pieces in the cavity, and, at the high speed, to form a barrier seal in the passageway about the extending blade element, whereby the centrifugal seal provides a seal under both static conditions and low- and high-speed operations of the rotatable shaft.

7. A seal assembly which includes:
(a) means to secure the seal of claim 6 onto a rotatable shaft;
(b) a rotatable shaft element to which the seal is secured; and
(c) a housing in which the seal is placed.

8. A method of sealing a rotatable shaft member from different environments under both static and low- and high-speed operations of the shaft, which method comprises:
(a) forming a seal between the different environments in the static condition and at low-speed operation of the shaft by a spaced plurality of magnetically retained, radial, ferrofluid rings disposed in a seal cavity, the ferrofluid under static conditions and at low speed retained by a defined magnetic force in a radial ring-sealing form in the cavity; and
(b) forming a seal between the different environments in the high-speed operation of the shaft by the movement of the ferrofluid outwardly by the centrifugal force of the high-speed rotation, which overcomes the magnetic retention of the ferrofluid in the ring form, and to form the ferrofluid as a barrier seal at the one extending end of the cavity, the ferrofluid moving between the ring form seal and the barrier seal, depending on the speed of the shaft.

9. The method of claim 8 wherein the different environments comprise low and high pressure.

10. The method of claim 8 wherein the rotatable shaft comprises the shaft of a flywheel.

11. The method of claim 8 wherein the cavity is characterized by a narrow, inverted, U-shaped passageway at the one extended end and which includes moving the ferrofluid into the passageway at high speed to form a barrier seal therein.

12. The method of claim 8 which comprises employing as the ferrofluid a ferrofluid with low curie-temperature properties.

13. The method of claim 8 which includes:
(a) positioning a stationary vane in the cavity, the vane having a blade at the one end;
(b) forming the O-ring ferrofluid seals about the periphery of the stationary vane; and
(c) forming the barrier seal about the blade at the one end of the cavity.

* * * * *